(12) United States Patent
Urban

(10) Patent No.: US 7,996,262 B2
(45) Date of Patent: Aug. 9, 2011

(54) SYSTEM AND METHOD FOR REDEEMING AFFINITY REWARDS AS POLITICAL CONTRIBUTIONS

(76) Inventor: David J. Urban, Potomac, MD (US)

(*) Notice: Subject to any disclaimer, the term of this patent is extended or adjusted under 35 U.S.C. 154(b) by 519 days.

(21) Appl. No.: 12/219,272

(22) Filed: Jul. 18, 2008

(65) Prior Publication Data

US 2009/0024483 A1    Jan. 22, 2009

Related U.S. Application Data

(60) Provisional application No. 60/961,390, filed on Jul. 20, 2007.

(51) Int. Cl.
*G06Q 30/00* (2006.01)
(52) U.S. Cl. ..................................................... 705/14.1
(58) Field of Classification Search .................. 705/14.1
See application file for complete search history.

(56) References Cited

U.S. PATENT DOCUMENTS

| | | | | |
|---|---|---|---|---|
| 5,466,919 | A * | 11/1995 | Hovakimian .................... | 705/17 |
| 6,128,599 | A * | 10/2000 | Walker et al. ............... | 705/14.27 |
| 6,581,041 | B1 * | 6/2003 | Canney ........................ | 705/36 R |
| 6,945,453 | B1 * | 9/2005 | Schwarz, Jr. .................. | 235/375 |
| 7,068,995 | B1 * | 6/2006 | Geddes et al. ................. | 455/406 |
| 7,080,775 | B2 * | 7/2006 | Gorelick ........................ | 235/379 |
| 7,321,876 | B1 * | 1/2008 | Wolfston ........................ | 705/39 |
| 7,809,641 | B2 * | 10/2010 | Sanders et al. .................. | 705/41 |
| 2001/0001855 | A1 * | 5/2001 | Ziarno ............................ | 705/39 |
| 2002/0174013 | A1 * | 11/2002 | Freeman et al. ................ | 705/14 |
| 2003/0028483 | A1 * | 2/2003 | Sanders et al. .................. | 705/40 |
| 2006/0089848 | A1 * | 4/2006 | Townsend ........................ | 705/1 |
| 2007/0088657 | A1 * | 4/2007 | Greene ........................... | 705/39 |
| 2008/0103970 | A1 * | 5/2008 | Books et al. ..................... | 705/39 |
| 2008/0249818 | A1 * | 10/2008 | Olliphant et al. ................ | 705/7 |
| 2008/0255951 | A1 * | 10/2008 | Miller et al. ..................... | 705/14 |
| 2008/0281706 | A1 * | 11/2008 | Sullivan ........................... | 705/14 |
| 2008/0313077 | A1 * | 12/2008 | Schropfer ........................ | 705/39 |

OTHER PUBLICATIONS

"Providian's Visa Targets Party Line's Bottom Line". American Banker, v 168, n 218, p. 11, Nov. 12, 2003.*
Newman, Jr., Joseph A, "Political Groups Offer Affinity Cards to Raise Funds for Candidates", American Banker, Feb. 5, 1988; p. 3; vol. 153, No. 25.*
Dignam, Conor, "Political Parties vie for direct approach", Marketing pp. 11, Jan 11, 1996.*
Kane, Michael, "Credit Cards with a cause: Affinity Programs: Organizations turn to plastic to raise funds", Financial Post, p. 06, Aug 12, 2000.*

(Continued)

*Primary Examiner* — Ella Colbert
*Assistant Examiner* — Mohammad Z Shaikh
(74) *Attorney, Agent, or Firm* — PCT Law Group, PLLC

(57) ABSTRACT

Systems, methods and computer program products for facilitating the redemption of affinity reward points as political contributions are disclosed. In an aspect, "points" or "miles" created through various existing affinity programs prevalent in the credit card and airline industries can be redeemed as political donations. Typically, such reward, award or bonus "points" or "miles" have been redeemed for free or discounted rewards such as airline tickets, hotel room stays, restaurant vouchers or other goods and services. However, millions of vested affinity points or miles are left unused (i.e., unredeemed). The present invention allows a consumer who holds such points or miles to link to a political campaign, political party or political action committee allowing excess points to be converted into cash donations to such political campaigns, political parties or political action committees.

9 Claims, 3 Drawing Sheets

OTHER PUBLICATIONS

Eaglesham, Jean, "Not just flexible but philanthropic, too", The Independent. London (UK): Mar 31, 1996. p. 16.*

Will that be Visa, MasterCard or . . . Liberal Visa?; [Final Edition], Edmonton Journal. Edmonton, Atla: Jun. 15, 1989. p. A. 10.*

Ellis, Stephen, "Too little credit for charity givers Affinity cards look a great way to donate to your favourite case, but Stephen Ellis asks if they are really good value compared with an ordinary credit card for both the giver and receiver", The Daily Telegraph. London (UK): Sep. 30, 2000. p. 05.*

Worthington, Steve, "What Makes a Successful Affinity Card?", Credit Card Management Europe. New York: Apr. 1992. vol. 1, iss. 9; p. 18.*

Lunn, Emma, "Sporting chance for savings Using an affinity deposit account that supports a football club or political party might not get you the best results, say Emma Lunn", Daily Telegraph, p. 014, Nov. 5, 2005.*

Federal Election Commission, Advisory Opinion 2003-16 (Aug. 14, 2003) (9 pages).

* cited by examiner

SYSTEM AND METHOD FOR REDEEMING AFFINITY REWARDS AS POLITICAL CONTRIBUTIONS

CROSS-REFERENCE TO RELATED APPLICATIONS

This Application claims the benefit of, and is related to, Applicant's application: U.S. Provisional Patent Application No. 60/961,390 titled "System for Redeeming Affinity Rewards as Political Contributions," filed on Jul. 20, 2007; which is incorporated by reference herein in its entirety.

BACKGROUND OF THE INVENTION

1. Field of the Invention

The present invention generally relates to affinity rewards granted to users of financial transaction cards and airline passengers, and more particularly to systems and methods for facilitating political campaign contributions using such affinity rewards programs.

2. Related Art

Political Donations

In the United States, the Federal Election Commission administers and enforces the Federal Election Campaign Act (FECA) and its associated regulations, which limit the sources and amounts of the contributions used to finance federal elections. Under these complex rules, an individual is permitted to contribute limited amounts of money based on the Consumer Price Index (CPI) in a particular election cycle. In the current 2007-2008 election cycle, for example, an individual can contribute up to $2,300 to each candidate or candidate committee per election, and up to $28,500 to national party committees (e.g., the Democratic National Committee (DNC) or the Republican National Committee (RNC), etc.) per calendar year.

Contributions of cash (currency) which in the aggregate exceed $100 from one person are prohibited. Thus, contributions exceeding $100 must be made by check, money order or other written instrument. In addition to money, donated items and services, fundraising tickets and items, as well as loans and loan endorsements are also considered contributions and thus count against the limits described above.

In addition to federal regulations promulgated and enforced by the FEC, the states themselves commonly place limits on contributions to candidates, political action committees (PACs) and political parties. Only five states, Illinois, New Mexico, Oregon, Utah and Virginia, place no limits on contributions at all. Another eight states—Alabama, Indiana, Iowa, Mississippi, Missouri, North Dakota, Pennsylvania, and Texas—have minimal contribution limits.

Current campaign finance law at the federal level requires candidate committees, party committees and PACs to file periodic reports disclosing the money they raise and spend. Federal candidate committees must identify, for example, the names, occupations, employers and addresses of all individuals who give them more than $200 in an election cycle. Additionally, they must disclose expenditures to any individual or vendor. Similar reporting requirements exist in many states for state-wide and local candidates, and for PACs and party committees. Increasingly, political committees on all levels are required to electronically file campaign finance statements.

Political contributions for federal elections cannot be deducted for tax purposes. Similarly, most state revenue agencies do not permit deductions for state or federal political contributions. Also not deductible are contributions made to organizations that directly lobby for political parties or candidates.

Within the regulatory framework described above, there were an estimated 2.8 million "small donors" contributing to federal, state and local political campaigns and parties in 2004 (the last presidential election year). "Small donors" are defined as those individuals who donated less than $200 in a given year. In fact, the average small donor made a contribution of just $75 in light of the $2300 maximum contribution. Thus, there is a lot of room for growth in political donation dollars and contributors.

Transaction Accounts & Affinity Programs

A "transaction account," as used herein, refers to an account associated with an open account or a closed account system (as defined below). The transaction account may exist in a physical or non-physical aspect. For example, a transaction account may be distributed in non-physical aspects such as an account number, frequent-flyer account, telephone calling account or the like. Furthermore, a physical aspect of a transaction account may be distributed as a financial transaction instrument.

A financial transaction instrument may be traditional "plastic" transaction cards, or other transaction cards such as credit, charge, debit, gift, pre-paid or stored-value cards, or any other like financial transaction instrument. Examples of such cards include the American Express®, Visa®, MasterCard® and Discover® cards, which are "open cards" and may be used at many different retailers and other businesses. In contrast, "closed cards" are financial transaction cards that may be restricted to use in a particular airline, particular store, a particular chain of stores or a collection of affiliated stores. One example of a closed card is a pre-paid gift card that may only be purchased at, and only be accepted at, a clothing retailer, such as The Gap® store.

With regard to use of a transaction account, users may communicate with merchants in person (e.g., at the ticket box office), telephonically, or electronically (e.g., from a computer via the Internet). During the interaction, the merchant may offer goods and/or services to the user. The merchant may also offer the user the option of paying for the goods and/or services using any number of available transaction accounts. Furthermore, the transaction accounts may be used by the merchant as a form of identification of the user. The merchant may have a computing unit implemented in the form of a computer-server, although other implementations are possible.

In general, transaction accounts may be used for transactions between the user and merchant through any suitable communication means, such as, for example, a telephone network, intranet, the global public Internet, a point of interaction device (e.g., a point of sale (POS) device, personal digital assistant (PDA), mobile telephone, kiosk, etc.), online communications, off-line communications, wireless communications, and/or the like.

Through use of the financial transaction instrument associated with a transaction account, the issuer of the financial transaction instrument may implement an affinity (or loyalty) program where "points", "frequent flier miles" or other rewards or awards (collectively, "points") are given the accountholder for using the instrument. Such points are typically redeemable for cash, prizes, free travel or discounts on merchandise and travel.

Affinity programs are essentially marketing programs designed to enhance brand loyalty by cultivating an ongoing relationship between a marketer and its customers. Loyalty programs encourage customers to buy frequently, to increase the amount spent each time, and to concentrate all or most of their related purchases on the brand offering the affinity program. Most affinity programs offer perks for membership in a club or program and reward purchases in such a way that it encourages behavior that is potentially of benefit to the issuer.

Typically, affinity programs issue a loyalty card, rewards card, points card, or club card that can be a plastic or paper card, visually similar to a financial transaction instrument such as a credit card, charge card, or debit card, that identifies the card holder as a member in the affinity program. Oftentimes, financial transaction instrument issuers associate their credit card or debit card with an affinity program without issuing a separate loyalty card, rewards card, points card, or club card. Examples of such affinity programs include airline frequent-flyer programs and credit card programs such as American Express's Membership Rewards® program with an estimated 9 million account holders, Bank of America's WorldPoints® program with an estimated 22 million account holders, Citibank's ThankYou Network® program with an estimated 22 million account holders, and Visa's Extras(V program with an estimated 55 million account holders. (All estimates are as of January 2006.)

Studies have shown that 60-70% of the reward points awarded through these credit card-related affinity programs go unredeemed. This is true even though most of these affinity programs allow such points to be converted into cash (ranging from $0.002 to $0.008 per point). The cash value of these unredeemed points, in 2006, was estimated to be $2.13 B. Further, in 2005, *Economist* magazine reported that frequent flyer miles toppled the U.S. dollar as the world's leading currency with some 14 trillion unredeemed miles worth over US $700B.

Given the foregoing, what is needed are systems, methods and computer program products for facilitating the redemption of affinity reward points as political contributions within the existing FECA statutory and regulatory framework described above.

BRIEF DESCRIPTION OF THE INVENTION

The present invention meets the above-identified needs by providing systems, methods and computer program products for facilitating the redemption of affinity reward points as political contributions within the existing regulatory framework described above.

The method and computer program product, in an aspect, comprise presenting an individual, via the website of a service provider, with a list of affinity programs from which to donate points to a political organization. Next, after receiving a selection of an affinity program, the individual is asked for a desired amount of (vested) points to be redeemed. Then, the desired amount of points is converted into a cash equivalent amount using the affinity programs stated conversion rules. In such an aspect, the desired amount of points is then deducted from the balance of the individual's affinity program account. The service provider can then forward a portion of the cash equivalent amount to the political organization (after deducting a percentage as a "processing" or "transaction" fee).

An advantage of the present invention is that it enables voting age American citizens to be engaged in the political process in a unique way that can grow the current base of 2.8 million small donors.

Another advantage of the present invention is that it facilitates connecting the appropriate stakeholders thereby enabling donors to convert credit card and other affinity program reward points to dollars for donation to federal, state and local political parties, organizations, and campaign runners.

Another advantage of the present invention is that it provides a new funding source, with over $2 B in market potential, for new donations by converting affinity program reward points to cash.

Yet another advantage of the present invention is that it provides federal, state, and local political parties, organizations, and campaign runners access to over 80 million potential new small donors via frequent flyer, credit card and other affinity rewards programs.

Yet another advantage of the present invention is that it drives larger average per-donor contributions and thus increases the $75 average small-donor contributions by adding affinity program-related donations to current cash donations.

Yet another advantage of the present invention is that it allows consumers to benefit from government agencies' and corporations' best practices of awarding full ownership of affinity points to employees using corporate credit cards, and awarding frequent-flyer miles to employees traveling on business.

Further features and advantages of the present invention, as well as the structure and operation of various aspects of the present invention, are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

DETAILED DESCRIPTION

Figure 1:
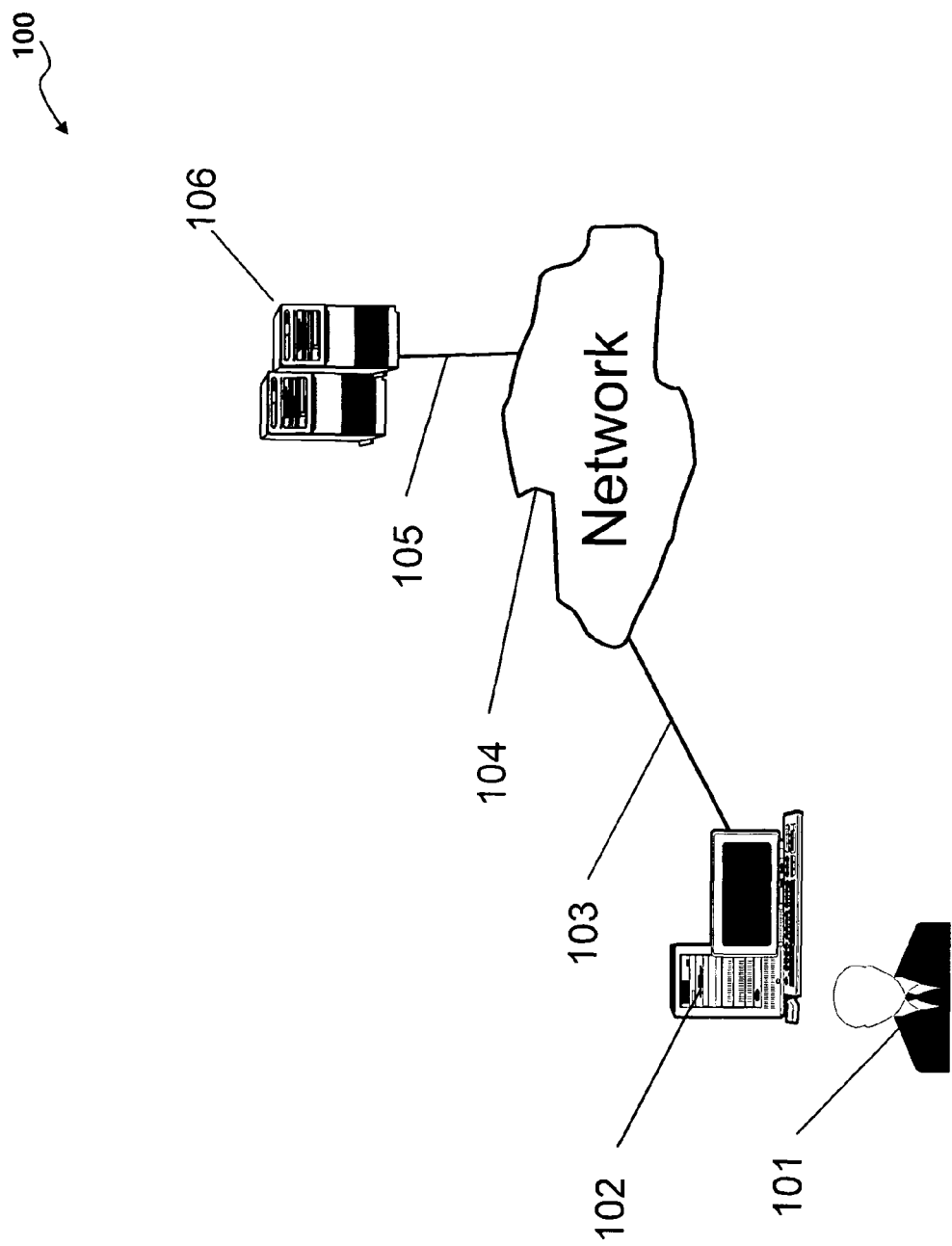
FIG. 1 is a system diagram of an exemplary environment in which the present invention, in an aspect, would be implemented.

The present invention is directed to systems, methods and computer program products for facilitating the redemption of affinity (i.e., mileage, reward, award, bonus, loyalty, etc.) points as political contributions.

In an aspect of the present invention, a system is provided whereby "points" created through various existing affinity programs prevalent in the airline and credit (or charge or debit) card industries can be redeemed as political donations. Typically heretofore, such "miles" or "points" have been redeemed for rewards such as free or discounted airline tickets, hotel room stays, restaurant vouchers or material goods. For many consumers, however, the affinity rewards become difficult to redeem because the traveling and spending that earned them itself often creates opportunities for free or discounted travel, hotel room stays and other goods. As a result, thousands of reward points accrue and are left unused. The present invention allows a consumer who holds points to link to a political campaign and excess points are converted to a cash donation to the campaign, or in some circumstances to a political entity such as a PAC or a political party through various legal entities created for political or issue-based fund raising.

In accordance with one aspect of the present invention, a donor chooses to donate points to a candidate or political party or cause. The donor is then directed to a affinity or channel partner and selects among affinity programs. The affinity program sponsor performs redemption and converts points to cash, which it sends to the donee. Alternatively, the donor may go directly to the affinity program's website once the donor becomes familiar with the redemption for political donation concept. In one aspect, the transaction is carried out via a series of linked, secure websites and includes carrying certain data (e.g., donor name, etc.) from one website to another. In one aspect, the system is secure and provides auditable transaction records to ensure compliance with FEC and other applicable regulations.

In accordance with another aspect of the present invention, "micro" donations, via points or the electronic transfer of funds, are made to particular elected officials or candidates on an immediate basis to reflect approval of a particular statement made by the official or candidate or in the case of an elected official, to reflect approval of a vote on a specific issue. For example, if a member of Congress votes to lower a tax, the millions of supporters of lower taxes could immediately donate funds, in amounts smaller than the typical political donation (e.g., 1000 points, 5000 miles, $1 or $5), reflecting their support of the issue and of the member's vote.

The present invention is now described in more detail herein in terms of the above exemplary contexts. This is for convenience only and is not intended to limit the application of the present invention. In fact, after reading the following description, it will be apparent to those skilled in the relevant art(s) how to implement the following invention in alternative aspects (e.g., under different regulatory schemes, other jurisdictions, etc.).

The terms "individual," "user," "donor," "consumer," "contributor," "card member," "customer," "cardholder," and/or the plural form of these terms are used interchangeably throughout herein to refer to those person(s) seeking to redeem affinity reward points as political contributions within the existing (and future) regulatory framework described above, and thus would benefit from the systems, methods and computer program products of the present invention.

Referring to FIG. 1, a (simplified) system diagram of an exemplary "Points for Politics™ system" in which the present invention, in an aspect, would be implemented is shown.

FIG. 1 presents an exemplary system diagram 100 of various hardware components and other features in accordance with an aspect of the present invention. As shown in FIG. 1, in an aspect of the present invention, data and other information and services for use in system 100 are, for example, input by a user (i.e., an individual consumer/political contributor) 101 via a terminal 102, such as a personal computer (PC), minicomputer, laptop, palmtop, mainframe computer, microcomputer, telephone device, mobile device, personal digital assistant (PDA), or other device having a processor and input, display and communications capabilities. Terminal 102 is coupled to a server 106, such as a PC, minicomputer, mainframe computer, microcomputer, server computer, or other device having a processor and one or more associated repositories for data or connection to one or more repositories for maintaining data, via a network 104, such as the global, public Internet, via (wired and/or wireless) communications couplings 103 and 105.

As will be appreciated by those skilled in the relevant art(s) after reading the description herein, in such an aspect, a service provider (i.e., a political contributions processor organization) may allow access, on a free registration, paid subscriber/membership, and/or pay-per-use basis, to the tool the present invention provides for facilitating the redemption of affinity points as political contributions via one or more World-Wide Web (WWW) sites on the Internet 104. Thus, system 100 is scaleable such that multiple participants may utilize it to allow their constituents to redeem, donate and generally interact with other users of system 100.

As will also be appreciated by those skilled in the relevant art(s), in an aspect, various screens (e.g., login, admin, account information, resources, upload, search, logout, redemption, registration, contribution, etc.) would be generated by server 106 in response to input from users 101 over the Internet 104. That is, in such an aspect, server 106 is a typical Web server running a server application at a Web site which sends out Web pages in response to Hypertext Transfer Protocol (HTTP) or Hypertext Transfer Protocol Secured (HTTPS) requests from remote browsers being used by users 101. Thus, server 106 is able to provide a graphical user interface (GUI) to users 101 of system 100 in the form of Web pages. These Web pages are sent to the user's PC, laptop, mobile device, PDA or like device 102, and result in the GUI screens being displayed.

As will also be appreciated by those skilled in the relevant art(s) after reading the description herein, alternate aspects of the present invention may include providing the tool for facilitating the redemption of affinity reward points as political contributions as an enterprise system wherein all the components of system 100 are connected and communicate via an intra-corporate wide area network (WAN) or local area network (LAN), rather than as a Web service (i.e., application service provider (ASP) model) as shown in FIG. 1.

Figure 2:
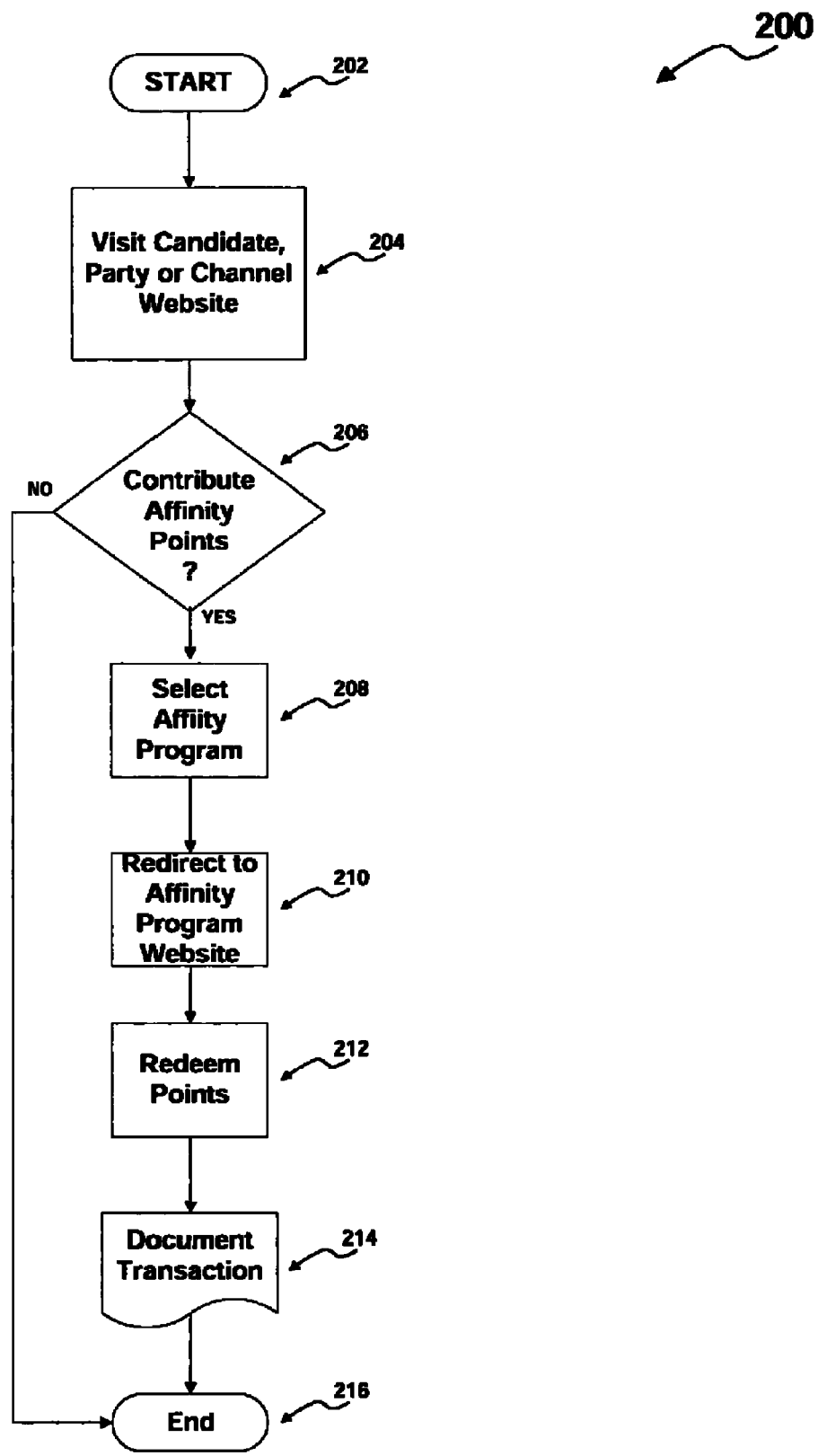
FIG. 2 is a flow chart of an exemplary process for facilitating the redemption of affinity reward points as political contributions, according to an aspect of the present invention.

Referring to FIG. 2, a flowchart illustrating an exemplary process 200 for facilitating the redemption of affinity reward points as political contributions, according to an aspect of the present invention, is shown. Process 200 begins at step 202 with control passing immediately to step 204.

In such an aspect of the present invention, a user 101 (e.g., an individual donor), utilizing terminal 102 visits the website of a political candidate, political party or other organization in step 204. While visiting that website, user 101 is presented with the option of contributing to the candidate or party in step 206. If user decides not to contribute, process 200 terminates as indicated by step 216. Otherwise, process 200 proceeds to step 208.

In step 208, user 101 is presented with the choice of affinity programs from which they would like to contribute to the political candidate or party. That is, as will be appreciated by those skilled in the relevant art(s) after reading the description herein, user 101 is given a list of participating affinity programs from which they can redeem available (i.e., vested) points earned from their transaction account. Such participating affinity programs, for example, may include American Express' Membership Rewards® program, Bank of America's WorldPoints® program, Citibank's ThankYou Network® program, Visa's Extras® program, Continental Airlines' OnePass® program, Delta Airlines' SkyMiles® program, jetBlue Airways' TrueBlue Awards® program, SouthWest Airlines' Rapid Rewards® program, US Airways' Dividend Miles™ program and the like.

Upon receiving an input reflecting the affinity program user 101 desires to redeem points from, process 200 redirects user 101 to the selected affinity program's proprietary website in step 210. Then, in step 212, the user may select the amount of points they wish to redeem from their available points based upon the selected affinity program's points-to-cash conversion rules (e.g., $0.005 per point). As will be appreciated by those skilled in the relevant art(s) after reading the description herein, affinity points redeemed as political contributions by an transaction account holder (e.g., cardholder) must be vested (i.e., points already earned) such that the contribution will be attributed, for FECA purposes, to the cardholder and not to the affinity program sponsor or, if the points were earned from a corporate card or business travel, the cardholder's employer.

As will be appreciated by those skilled in the relevant art(s) after reading the description herein, a service provider (i.e., a political contributions processor organization) would facilitate process 200 by establishing arms-length, commercially-reasonable contractual relationships with affinity program sponsors/providers (e.g., credit card issuers and airlines) and political organizations (e.g., individual election campaigns, political parties or associations, or political action committees). Such contractual relationships would facilitate the affinity program selection (step 208) and website redirection (step 210) described above. Further, this would allow the service provider to document the affinity points redemption transaction in step 214 and thus allow the service provider to charge a transaction or processing fee (i.e., a percentage, say for example 10%, of the cash equivalent of the affinity points donated) to the political campaigns benefitting from process 200. In such an aspect, the transaction or processing fee is charged to the campaign, PAC or political party and allows the service provider to cover its operating costs and/or earn a profit. Thus, the party would need to record the full cash value of the donated affinity points as a contribution, even though their actually cash-on-hand would be less. (Thus, if the processing fee is, for example, 10%, then a vested affinity points contribution equaling $100 would be recorded as a $100 contribution from the donor even though the campaign, PAC or political party would only receive $90 cash-in-hand.)

Process 200 then terminates as indicated by step 216. As will be appreciated by those skilled in the relevant art(s) after reading the description herein, the service provider, in an aspect of process 200, could receive the cash equivalent of the donated affinity points from the affinity points sponsor (i.e., be paid like any other vendor or merchant that accepts credit/debit cards) and then forward the "cash" minus the processing fee to the campaign, PAC or political party.

It should be understood that process 200 shown in FIG. 2 is presented for example purposes only. The present invention is sufficiently flexible and configurable, such that it may be implemented in ways other than that shown in FIG. 200. For example, users 101 may be presented with a single website where they can select an affinity program, check their points balance, convert some or all of those points to cash and then donate them to a political candidate or party, thus obviating the need to be redirected to another site with certain (HTTP referrer) information (e.g., donor name, affinity program, transaction account number, etc.) having to traverse the Internet 104. In such an aspect, user 101 may be presented, for example, with a "Donate Points Now" button while visiting the website of a campaign, PAC or political party. By pressing or selecting such button via their device 102 in a "one-click" fashion, user 101 would be presented with a list of affinity programs from which to donate points, be allowed to select an affinity program and the desired amount of points (e.g., via a pop-up window), have their transaction account associated with the selected affinity program be queried to assure the balance is equal to or greater than the desired contribution amount, have the points converted into a cash equivalent amount and deducted from their account balance, and then have the cash equivalent amount be forwarded to the campaign, PAC or political party (minus the "processing" or "transaction" fee).

The present invention (i.e., system 100, process 200, and the systems and methods for facilitating the redemption of affinity reward points as political contributions described above of the present invention, or any part(s) or function(s) thereof) may be implemented using hardware, software or a combination thereof and may be implemented in one or more computer systems or other processing systems. However, the manipulations performed by the present invention were often referred to in terms, such as "selecting" or "documenting," which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

Figure 3:
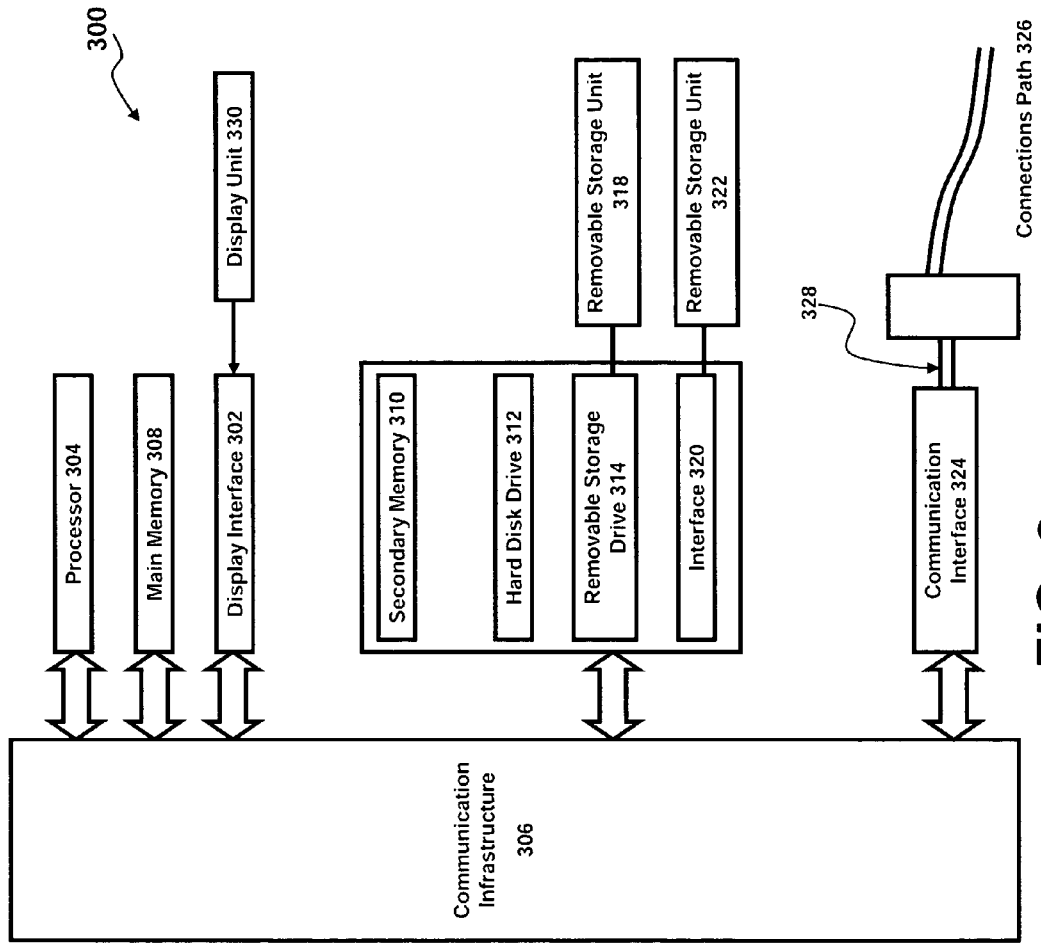
FIG. 3 is a block diagram of an exemplary computer system useful for implementing the present invention.

In fact, in one aspect, the invention is directed toward one or more computer systems capable of carrying out the functionality described herein. An example of a computer system 300 is shown in FIG. 3.

Computer system 300 includes one or more processors, such as processor 304. The processor 304 is connected to a communication infrastructure 306 (e.g., a communications bus, cross-over bar, or network). Various software aspects are described in terms of this exemplary computer system. After reading this description, it will become apparent to a person skilled in the relevant art(s) how to implement the invention using other computer systems and/or architectures.

Computer system 300 can include a display interface 302 that forwards graphics, text, and other data from the communication infrastructure 306 (or from a frame buffer not shown) for display on the display unit 330.

Computer system 300 also includes a main memory 308, preferably random access memory (RAM), and may also include a secondary memory 310. The secondary memory 310 may include, for example, a hard disk drive 312 and/or a removable storage drive 314, representing a floppy disk drive, a magnetic tape drive, an optical disk drive, etc. The removable storage drive 314 reads from and/or writes to a removable storage unit 318 in a well known manner. Removable storage unit 318 represents a floppy disk, magnetic tape, optical disk, etc. which is read by and written to by removable storage drive 314. As will be appreciated, the removable storage unit 318 includes a computer usable storage medium having stored therein computer software and/or data.

In alternative aspects, secondary memory 310 may include other similar devices for allowing computer programs or other instructions to be loaded into computer system 300. Such devices may include, for example, a removable storage unit 322 and an interface 320. Examples of such may include a program cartridge and cartridge interface (such as that found in video game devices), a removable memory chip (such as an erasable programmable read only memory (EPROM), or programmable read only memory (PROM)) and associated socket, and other removable storage units 322 and interfaces 320, which allow software and data to be transferred from the removable storage unit 322 to computer system 300.

Computer system 300 may also include a communications interface 324. Communications interface 324 allows software and data to be transferred between computer system 300 and external devices. Examples of communications interface 324 may include a modem, a network interface (such as an Ethernet card), a communications port, a Personal Computer Memory Card International Association (PCMCIA) slot and card, etc. Software and data transferred via communications interface 324 are in the form of signals 328 which may be electronic, electromagnetic, optical or other signals capable of being received by communications interface 324. These signals 328 are provided to communications interface 324 via a communications path (e.g., channel) 326. This channel 326 carries signals 328 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 314, a hard disk installed in hard disk drive 312, and signals 328. These computer program products provide software to computer system 300. The invention is directed to such computer program products.

Computer programs (also referred to as computer control logic) are stored in main memory 308 and/or secondary memory 310. Computer programs may also be received via communications interface 324. Such computer programs, when executed, enable the computer system 300 to perform the features of the present invention, as discussed herein. In particular, the computer programs, when executed, enable the processor 304 to perform the features of the present invention. Accordingly, such computer programs represent controllers of the computer system 300.

In an aspect where the invention is implemented using software, the software may be stored in a computer program product and loaded into computer system 300 using removable storage drive 314, hard drive 312 or communications interface 324. The control logic (software), when executed by the processor 304, causes the processor 304 to perform the functions of the invention as described herein.

In another aspect, the invention is implemented primarily in hardware using, for example, hardware components such as application specific integrated circuits (ASICs). Implementation of the hardware state machine so as to perform the functions described herein will be apparent to persons skilled in the relevant art(s).

In yet another aspect, the invention is implemented using a combination of both hardware and software.

While various aspects of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary aspects, but should be defined only in accordance with the following claims and their equivalents.

In addition, it should be understood that the figures in the attachments, which highlight the structure, methodology, functionality and advantages of the present invention, are presented for example purposes only. The present invention is sufficiently flexible and configurable, such that it may be implemented in ways other than that shown in the accompanying figures.

Further, the purpose of the foregoing Abstract is to enable the U.S. Patent and Trademark Office and the public generally, and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present invention in any way.

What is claimed is:

1. A method for facilitating the redeeming of affinity points as political contributions, comprising:
  a) querying an individual, via the website of a political organization, whether said individual would like to donate points from an affinity program to said political organization;
  b) presenting said individual via a server, when the result of said querying step (a) is positive, with a list of affinity programs from which to donate points to said political organization, and, when negative, the facilitating method does not proceed with points from an affinity program;
  c) receiving, from said individual, a selection of a desired affinity program from among said list of affinity programs;
  d) receiving, from said individual, a desired amount of points to be redeemed from said desired affinity program;
  e) deducting said desired amount of points to be redeemed from an affinity program selected in step c) by said individual;
  f) converting said desired amount of points into a cash equivalent amount; and
  g) forwarding at least a portion of said cash equivalent amount to said political organization.

2. The method of claim 1, wherein said political organization is one of: an individual candidate campaign; a political action committee; a national political party; a state political party; and a local political party.

3. The method of claim 1, wherein said list of affinity programs includes at least one of: an affinity program associated with a financial transaction instrument; and an affinity program associated with an airline frequent-flyer account.

4. The method of claim 1, wherein said desired affinity program is associated with a financial transaction instrument in the form of one of: a credit card; a charge card; a debit card; and a stored-value card.

5. The method of claim 1, further comprising:
  g) deducting a percentage of said cash equivalent amount as a processing fee prior to said forwarding step (g).

6. The method of claim 1, further comprising:
  g) redirecting said individual to a website associated with said desired affinity program;
  whereby at least said step (d) and said step (f) take place within said website associated with said desired affinity program.

7. A non-trasitory computer. readable medium comprising control logic stored therein for causing a computer to facilitate the redeeming of affinity points as political contributions, said control logic comprising:
  first non-transitory computer readable program code for causing the computer to query an individual whether said individual would like to donate points from an affinity program to said political organization;
  second non-transitory computer readable program code for causing the computer to present said individual with a list of affinity programs from which to donate points to said political organization;

third non-transitory computer readable program code for causing the computer to receive, from said individual, a selection of a desired affinity program from among said list of affinity programs;

fourth non-transitory computer readable program code for causing the computer to receive, from said individual, a desired amount of points to be redeemed from said desired affinity program;

fifth non-transitory computer readable program code for causing the computer to convert said desired amount of points into a cash equivalent amount;

sixth non-transitory computer readable program code for causing the computer to deduct said desired amount of points from the balance of an account belonging to said individual and associated with said desired affinity program; and seventh non-transitory computer readable program code for causing the computer to initiate a transfer of funds equaling at least a portion of said cash equivalent amount to said political organization.

8. The non-transitory computer readable medium of claim 7, further comprising: seventh computer readable program code for causing the computer to deduct a percentage of said cash equivalent amount as a processing fee.

9. The non-transitory computer readable medium of claim 7, wherein said political organization is one of:
an individual candidate campaign; a political action committee; a national political party; a state political party; and a local political party.

* * * * *